United States Patent [19]
Taylor

[11] 3,837,683
[45] Sept. 24, 1974

[54] PIPE JOINT SLEEVE
[75] Inventor: Thomas B. Franklin Taylor, Islington, Ontario, Canada
[73] Assignee: Ste Croix Foundry Ltd., Ste Croix, Calif.
[22] Filed: Aug. 2, 1973
[21] Appl. No.: 385,025

[30] Foreign Application Priority Data
May 9, 1973  Canada .................. 170827

[52] U.S. Cl. .................. 285/236, 285/259
[51] Int. Cl. .......................... F16l 21/00
[58] Field of Search ........... 285/236, 235, 259, 369

[56] References Cited
UNITED STATES PATENTS
3,142,502  7/1964  Luther .................. 285/259 X
3,233,922  2/1966  Evans .................... 285/236
3,334,928  8/1967  Schmunk ............... 285/236 X
3,359,017  12/1967 Schaub .................. 285/236
3,453,006  7/1969  Levake ................. 285/235 X
3,479,066  11/1969 Gittleman .............. 285/236
3,527,484  9/1970  Walkden ................ 285/236
3,572,773  3/1971  Read .................... 285/236

Primary Examiner—Alfred R. Guest
Attorney, Agent, or Firm—Anthony J. Casella

[57] ABSTRACT

The present invention relates to a sleeve for a packing disposed about the joint existing between adjacent ends of a pair of substantially axially pipes. The inner periphery of the sleeve is provided with a plurality of non-communicating compartments which serve to inhibit leakage from such a joint.

11 Claims, 4 Drawing Figures

PIPE JOINT SLEEVE

The invention relates to a pipe-joint for use in sealing adjacent ends of a pair of pipes and a sleeve for the latter being eminently suitable for forming part of the type of pipe joint shown in U.S. Pat. No. 3,233,922. The pipe joint described and illustrated in the above patent includes a resilient annular packing member or sleeve disposed about the joint existing between the ends of the pipes and which sleeve is itself disposed within an adjustable and circumferential clamping member. The inner periphery of such a packing member or sleeve is provided with a main central annular rib located between the said ends of the pipes and a plurality of similar ribs located either side of the main rib and contacting the outer peripheries of said pipe ends. The purpose of all such ribs has been to inhibit leakage from the joint.

Whilst this type of sleeve has been extremely satisfactory when used with pipes having relatively smooth outer peripheries, some leakage has been experienced where the outer peripheries of the pipes have been rough cast.

Thus it is the object of the present invention to overcome the above disadvantage by providing a pipe jointing sleeve which will inhibit leakage from the joint no matter whether the ends of the pipe are smooth or rough cast.

The invention is illustrated, by way of example, in the accompanying drawings, in which.

Figure 1:
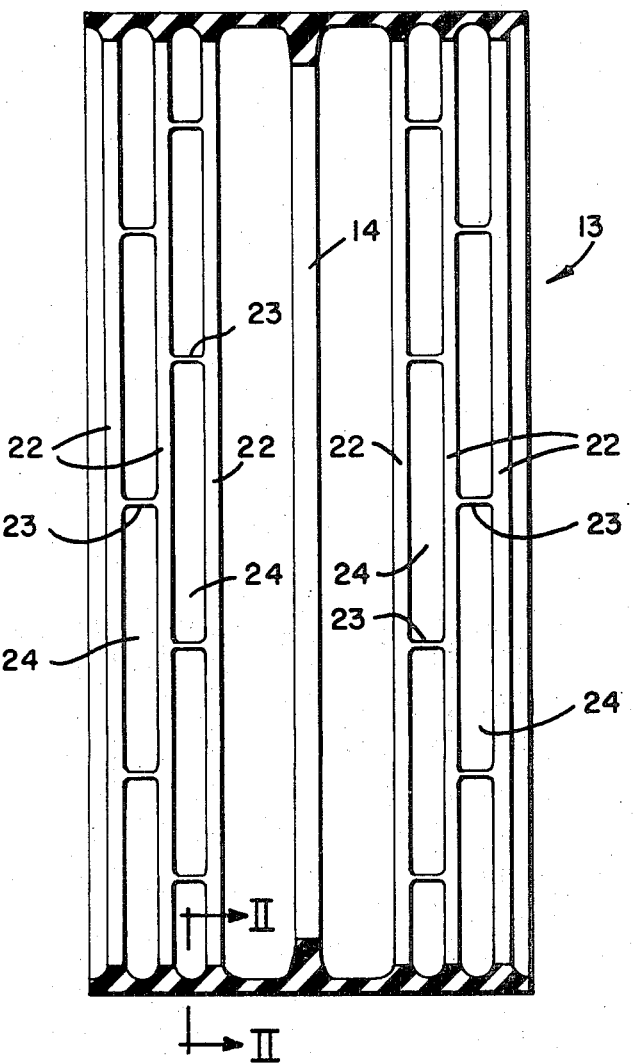
FIG. 1 is a cross-section of the sleeve.
Figure 2:
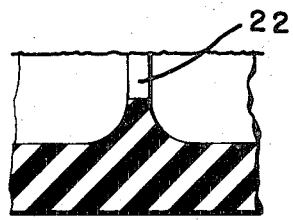
FIG. 2 is a detail view taken on the line II—II of FIG. 1.
Figure 3:
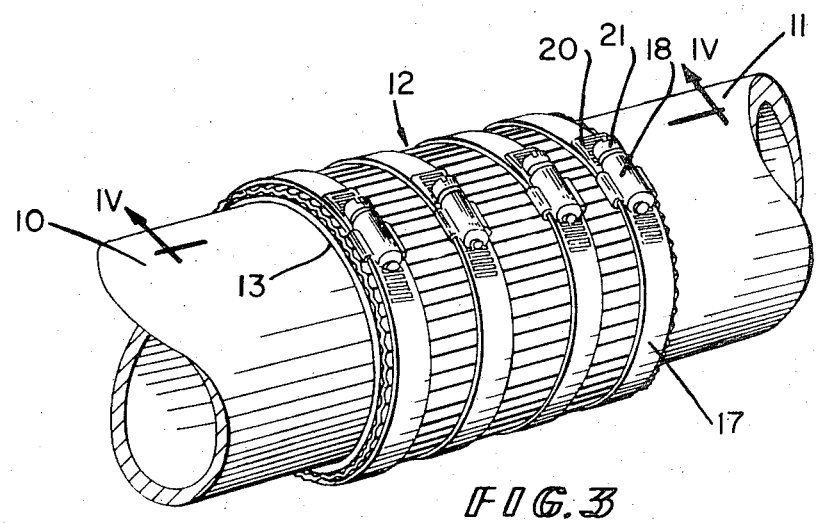
FIG. 3 is a perspective view of an assembled pipe joint.
Figure 4:
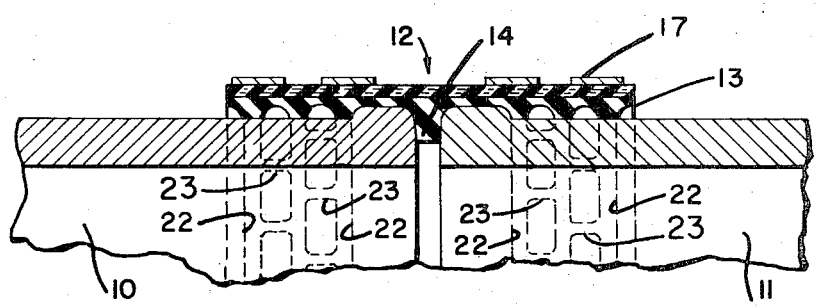
FIG. 4 is a section taken on the line IV–IV of FIG. 3.

Referring to the drawings, and in particular to FIGS. 1 and 2, the pipe joint includes a resilient packing sleeve 13 which is preferably moulded from an elastomer, e.g. synthetic rubber (neoprene or butyl rubber) or EPDM which is a terpolymer of ethylene, propylene and a non-conjugated diene. The inner periphery of the sleeve has a substantially central, primary, inwardly projecting sealing rib 14, and a plurality of secondary circumferential sealing ribs 22 of less depth and width then rib 14. The secondary ribs 22 of each adjacent pair thereof are connected together by means of inwardly spaced axially extending sealing cross ribs 23. Moreover, the cross ribs 23 connecting one pair of adjacent secondary ribs 22 are circumferentially staggered with respect to connecting the next adjacent pair of secondary ribs 22. Thus, the secondary ribs 22 and the cross ribs 23 define a plurality of noncommunicating annular compartments 24 disposed around the inner periphery of the packing member or sleeve 13. In use, the sleeve 13 is slipped over one end of a pipe 10 (see FIGS. 3 and 4) and then the end of another pipe 11 is inserted into the free end of sleeve 13, whereby, and as is shown in FIG. 4, the primary rib 14 will prevent physical contact between the adjacent and substantially axially aligned terminal end faces of pipes 10, 11. As will also be seen from FIG. 4, the secondary ribs 22 and the cross ribs 23 will be in contact with the outer peripheries of the adjacent ends of the pipes.

A circumferential corrugated band, indicated generally at 12, is then placed around the outside of the sleeve and its open ends are drawn together, in known fashion, through the intermediary of clamping bands 17 provided with cooperating slots 20 and screws 21, rotatably mounted on clamping units 18. The cooperation of the slots 20 and screws 21 tightens the bands 17 and compresses the band 12 thereby tightening the packing sleeve into sealing engagement with the ends of the pipes 10, 11.

If, for any reason, leakage should occur around the primary rib 14, such leakage should be held in check by the next adjacent secondary rib 22. If, by the remotest change, leakage should occur around the last-mentioned rib, then it should be held in check by the compartments 24 which would thereby confine the leakage and prevent it from spreading around the entire circumference of the outer periphery of the particular pipe in question.

I claim:

1. A sleeve for use in a device for sealing adjacent and substantially axially aligned ends of a pair of pipes, said sleeve being formed of resilient material and having a substantially central, primary, inwardly projecting annular sealing rib, a plurality of secondary circumferential sealing ribs, and a plurality of annularly spaced, axially extending, sealing cross-ribs connecting the secondary ribs in each adjacent pair thereof with one another, said secondary ribs and said cross-ribs defining a plurality of non-communicating annular compartments disposed around the inner periphery of said sleeve.

2. A sleeve according to claim 1 wherein the cross-ribs connecting one pair of adjacent secondary ribs are circumferentially staggered with respect to the cross-ribs connecting the next adjacent pair of secondary ribs.

3. A sleeve according to claim 2 wherein the primary rib is adapted to be interposed between the terminal faces of the ends of the pipes, and the secondary ribs and the cross-ribs are maintained in sealing contact with the outer periphery of each said end by means of a clamping band disposed about said sleeve.

4. A sleeve according to claim 3 moulded from synthetic rubber.

5. A sleeve according to claim 3 moulded from neoprene.

6. A pipe joint comprising a clamping band adapted to surround abutting ends of pipe sections to be joined; a resilient, annular packing member within said clamping band for sealing the joint when said clamping band is tightened, the inner periphery of the packing member having a plurality of non-communicating compartments disposed around the inner periphery of the packing member; and means for tightening said clamping band about said packing member and into sealing contact with said ends.

7. A joint according to claim 5 wherein the inner periphery of the packing member has a substantially central, primary, inwardly projecting sealing rib, a plurality of secondary circumferential sealing ribs, and a plurality of annularly spaced, axially extending, sealing cross-ribs connecting the secondary ribs in each adjacent pair thereof with one another, said secondary ribs and said cross-ribs defining said annularly disposed non-communicating compartments.

8. A joint according to claim 7 wherein the cross-ribs connecting one pair of adjacent secondary ribs are circumferentially staggered with respect to the cross-ribs connecting the next adjacent pair of secondary ribs.

9. A joint according to claim 7 wherein the primary rib is adapted to be interposed between the terminal faces of the ends of the pipes, and the secondary ribs and the cross-ribs are maintained in sealing contact with the outer periphery of each said end by means of said clamping band.

10. A joint according to claim 9 wherein the packing member is moulded from synthetic rubber.

11. A joint according to claim 9 wherein the packing member is moulded from neoprene.

* * * * *

UNITED STATES PATENT OFFICE
CERTIFICATE OF CORRECTION

Patent No. 3,837,683    Dated September 24, 1974

Inventor(s) Thomas B. Franklin Taylor

It is certified that error appears in the above-identified patent and that said Letters Patent are hereby corrected as shown below:

On the cover sheet item [73] "Ste Croix, Calif." should read -- Ste Croix, Canada --.

Signed and sealed this 19th day of November 1974.

(SEAL)
Attest:

McCOY M. GIBSON JR.　　　　　　　　C. MARSHALL DANN
Attesting Officer　　　　　　　　　Commissioner of Patents FORM PO-1050 (10-69)　　　　　　　　　　　　　　USCOMM-DC 60376-P69
　　　　　　　　　　　　　　　　　U.S. GOVERNMENT PRINTING OFFICE: 869-930